A. HUTCHINSON & S. I. LYND.
Improvement in Bean-Harvesters.

No. 132,210.    Patented Oct. 15, 1872.

UNITED STATES PATENT OFFICE.

ARTHUR HUTCHINSON AND STEPHEN I. LYND, OF ALBION, NEW YORK, ASSIGNOR TO ARTHUR HUTCHINSON, OF GAINES, NEW YORK.

IMPROVEMENT IN BEAN-HARVESTERS.

Specification forming part of Letters Patent No. 132,210, dated October 15, 1872.

*To all whom it may concern:*

Be it known that we, ARTHUR HUTCHINSON and STEPHEN I. LYND, of Albion, New York, have made certain Improvements in Bean-Pullers, of which the following is a specification:

Nature and Objects of the Invention.

Our invention consists of a frame-work supported on wheels, carrying a wheel composed of two sets of vanes, which run near the ground; and is operated in such a manner by cams as to close the vanes, when near the ground, in such a way as to clamp the stalks of the beans with sufficient firmness to pull them as the wheel revolves, and also to open the vanes at the top to deliver the beans into a trough, which in turn delivers them onto an endless apron. This apron is provided with reversible gearing, by means of which it may be made to deliver the beans in gavels on either side of the machine.

The object of the invention is to provide a machine which will pull beans without shelling them, and to deliver them in gavels on either side of the machine.

Description of the Accompanying Drawing.

Figure 1:
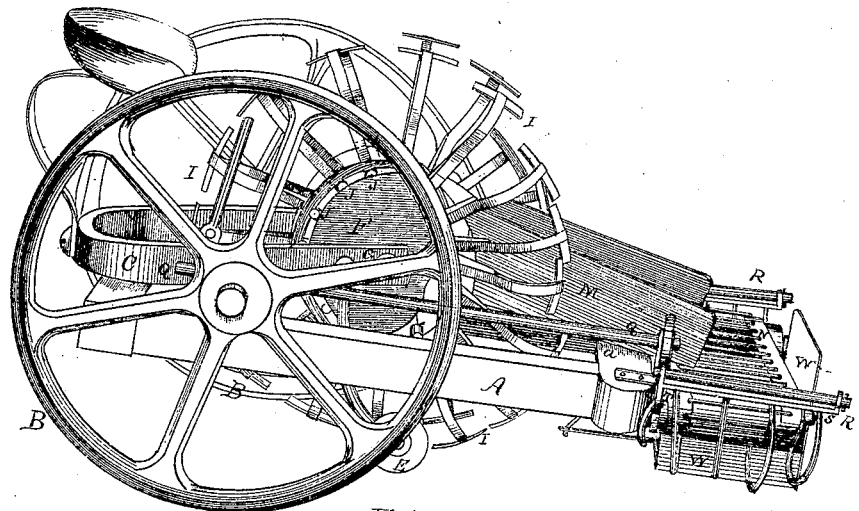
Figure 2:
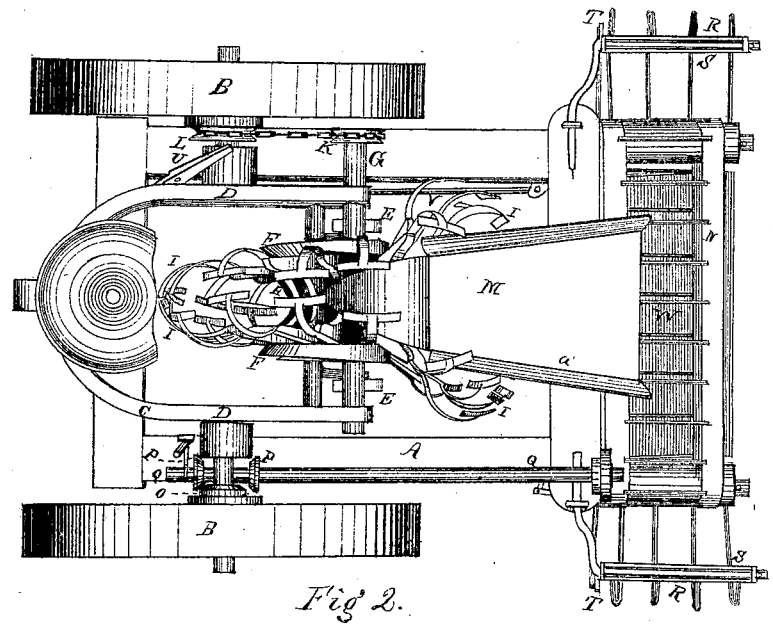

Figure 1 is a side elevation. Fig. 2 is a top view.

General Description.

A is a frame supported by the driving-wheels B B. C is a frame hinged to the frame A at D, and is supported at the other end by the ground-wheels E E; to this frame the cams F F are fixed concentric with the shaft G. H is a hub which is fixed to the shaft G. I I, &c., are wings or vanes, which are hinged to the hub H in such a way as to admit of lateral motion. J J J, &c., are arms attached to the vanes, extending downward so as to engage with the cams F F. K is a chain shive, which is keyed on the shaft G and is driven by a chain running from the shive L, attached to the drive-wheel B. M is a trough, which is supported by the shaft G at the inner end, and is hinged to the frame A at *a*. This trough is inclined downward at its outer end. N is an endless apron running across the entire front of the machine at right angles with the trough M and parallel with the shaft G, and is actuated by bevel-gear consisting of the wheel O, which is attached to the driving-wheel B, and the pinions P P, which are so placed on the shaft Q as to be capable of shifting, so that either may mesh with the wheel O and thus change the motion of the apron. R R are droppers placed at the ends of the apron N. They consist of a number of tines bent at right angles and made fast to the rock-shaft S. T is a lever attached to the rock-shaft S, which is connected with a hand-lever, U, by means of the rod V. A pole or thills are attached to the machine in such a manner as to permit the horse to walk between the rows of beans.

The operation is as follows: As the machine is drawn forward the vanes I I I, &c., are made to revolve by means of the connection made by the shives K and L and the chain connecting them, and as they revolve they are made to close when near the ground, clamping the stalks. By the upward motion of the vanes the stalks are drawn from the ground, and as the wheel revolves the beans are dropped into the trough M, which delivers them onto the endless apron N. This carries them into the dropper R, when they are dropped at the will of the driver.

We claim as our invention—

1. The combination of the vanes I, hub H, cams F, swinging frame C, substantially as and for the purpose hereinbefore set forth.

2. The combination, with the above-named devices, of the apron N, trough M, shifting-gear O and P P, and dropper R, substantially as and for the purpose hereinbefore set forth.

ARTHUR HUTCHINSON.
STEPHEN I. LYND.

Witnesses:
HENRY A. GLIDDEN,
WM. D. ROBSON.